United States Patent
Schaper

(10) Patent No.: US 12,060,230 B2
(45) Date of Patent: Aug. 13, 2024

(54) DRIVE MEANS FOR CONVEYOR BELTS, IN PARTICULAR OF AGRICULTURAL MACHINES, AND METHOD FOR THE PRODUCTION THEREOF

(71) Applicant: Arntz Beteiligungs GmbH & Co. KG, Höxter (DE)

(72) Inventor: Marcel Schaper, Kirchbrak (DE)

(73) Assignee: ARNTZ BETEILIGUNGS GMBH & CO. KG, Hoexter (DE)

(*) Notice: Subject to any disclaimer, the term of this patent is extended or adjusted under 35 U.S.C. 154(b) by 576 days.

(21) Appl. No.: 17/170,977

(22) Filed: Feb. 9, 2021

(65) Prior Publication Data

US 2021/0246966 A1 Aug. 12, 2021

(30) Foreign Application Priority Data

Feb. 10, 2020 (DE) ............. 10 2020 103 294.3

(51) Int. Cl.
| | | |
|---|---|---|
| *B65G 15/42* | (2006.01) | |
| *A01D 61/02* | (2006.01) | |
| *B29D 29/08* | (2006.01) | |
| *B65G 15/36* | (2006.01) | |
| *A01F 15/18* | (2006.01) | |

(52) U.S. Cl.
CPC ............. *B65G 15/42* (2013.01); *A01D 61/02* (2013.01); *B29D 29/085* (2013.01); *B65G 15/36* (2013.01); *A01F 2015/183* (2013.01)

(58) Field of Classification Search
CPC ... A01D 61/02; A01F 2015/183; B29D 29/00; B29D 29/085; B65G 15/34; B65G 15/36; B65G 15/42; B65G 15/52; F16G 1/06; F16G 1/28
See application file for complete search history.

(56) References Cited

U.S. PATENT DOCUMENTS

| | | | | |
|---|---|---|---|---|
| 2,522,359 | A * | 9/1950 | Haren ................ | B29D 29/00 264/347 |
| 4,023,671 | A | 5/1977 | Kramer | |
| 4,329,192 | A | 5/1982 | White et al. | |
| 4,361,456 | A * | 11/1982 | Reschke ............. | B29D 29/06 156/137 |

(Continued)

FOREIGN PATENT DOCUMENTS

| | | |
|---|---|---|
| DE | 26 46 352 | 4/1978 |
| DE | 10 2009 036 104 B4 | 2/2011 |
| DE | 11 2015 000 769 T1 | 11/2016 |
| DE | 10 2016 112 301 A1 | 1/2018 |

(Continued)

OTHER PUBLICATIONS

Fritz Rothemeyer: Kautschuktechnologie; 2006, pp. 679-681.

*Primary Examiner* — Gene O Crawford
*Assistant Examiner* — Keith R Campbell
(74) *Attorney, Agent, or Firm* — WC&F IP

(57) ABSTRACT

A flat belt provides an endless traction suitable for conveyor belts, and has no fabric insert in the force transmission region. In some embodiment it has no fabric insert in the back of the belt. The flat belt is formed by a multistage method which includes forming a flat belt with a main body and endless tension member elements, by a rotary vulcanization process, and subsequently forming at least a part of the force transmission region on the flat belt. The flat belt may be used in agricultural machines which convey agricultural harvested material.

9 Claims, 3 Drawing Sheets

(56) References Cited

U.S. PATENT DOCUMENTS

Figure 1A:
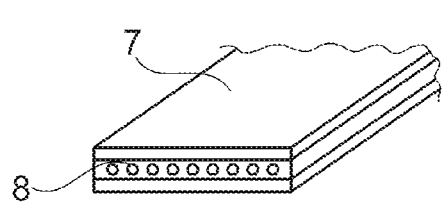

| | | | | | |
|---|---|---|---|---|---|
| 4,553,663 | A | * | 11/1985 | Johnson | B65G 15/52 |
| | | | | | 198/848 |
| 4,697,693 | A | | 10/1987 | Rajala et al. | |
| 5,860,883 | A | * | 1/1999 | Jonen | C08K 5/098 |
| | | | | | 474/271 |
| 6,616,558 | B2 | * | 9/2003 | South | F16G 1/28 |
| | | | | | 156/137 |
| 8,596,447 | B2 | * | 12/2013 | Gentz | B65G 15/52 |
| | | | | | 198/731 |
| 10,000,029 | B2 | * | 6/2018 | Miyata | B29C 65/48 |
| 10,149,437 | B2 | * | 12/2018 | Van Overschelde | A01D 41/16 |
| 10,183,807 | B2 | * | 1/2019 | Jäger | B65G 15/44 |

FOREIGN PATENT DOCUMENTS

| | | |
|---|---|---|
| DE | 10 2016 112 305 A1 | 1/2018 |
| DE | 10 2016 217 725 A1 | 3/2018 |
| EP | 3 438 024 A1 | 2/2019 |
| WO | 2011/068729 A1 | 6/2011 |
| WO | 2018/050301 A1 | 3/2018 |

* cited by examiner

DRIVE MEANS FOR CONVEYOR BELTS, IN PARTICULAR OF AGRICULTURAL MACHINES, AND METHOD FOR THE PRODUCTION THEREOF

In a first aspect, the present invention relates to a flat belt as an endless traction means suitable for conveyor belts, wherein the flat belt has no fabric insert in the force transmission region and optionally no fabric insert in the back of the belt. In a further aspect, a method for producing a flat belt as an endless traction means is provided. This method is a multistage method involving the steps of forming a flat belt with a main body and endless tension member elements, present therein, by means of a rotary vulcanization process, and subsequently forming at least a part of the force transmission region on the flat belt obtained by the rotary vulcanization process. Furthermore, drive means for conveyor belts, comprising a flat belt according to the invention are provided, and agricultural machines having a conveying device, designed to convey agricultural harvested material, having a flat belt or conveyor belt according to the invention.

PRIOR ART

Flat belts, which are used in particular in the agricultural sector in harvesters, for example for pressing agricultural harvested material, for instance hay or straw, are exposed to significant loads. Flat belts serve as drive means for conveyor belts in such machines, for example in the form of rod elevators, with which the harvested material is conveyed and compressed into a bale form.

These belts are exposed to high forces in order, for example, to absorb the necessary forces for compressing material to be pressed.

In order to allow sufficient fatigue strength of these flat belts, a plurality of fabric layers are currently used. Thus, DE 10 2009 036 104 B4 describes an inclined conveyor for combine harvesters, wherein endless traction means in the form of belts made of crosslinked polymer reinforced with fabric layers are used. In that case, at least two fabric layers with rubber layers arranged in between are used. In a development of these flat belts, tension members made of different materials, but in particular of polymeric material, for instance polyamide, polyester or aramid cord, are additionally introduced between the fabric layers in order for it to be possible to absorb the corresponding tensile forces and to improve the fatigue strength. Corresponding belts as endless traction means for conveyor belts are described in DE 10 2016 112 301 A1 and DE 10 2016 112 305 A1. In those cases, a combination of fabric and tension members is used, wherein the tension members can consist for the one part of steel and for the other part of polymeric material such as polyester, polyamide, Kevlar or synthetic fibers. Both the tension member material and the fabric are in those cases usually incorporated in a material made of a polymeric substance, for instance chloroprene or styrene-butadiene rubber.

These described flat belts for use in conveyor belts of agricultural machines require long belt lengths, such as belt lengths of at least 4 meters. Accordingly, the production of these flat belts proves to be difficult. On account of the necessary belt lengths, such belts according to the prior art are usually manufactured by sectional vulcanization in a vulcanizing press. The belts are either produced as endless belts or, alternatively, the belts are connected by means of fasteners, and furthermore, it is possible for the belts to be overlapped and vulcanized in an endless manner or be wound overall in an endless manner. Both belts that are wound in an endless manner and belts provided with fasteners have advantages and disadvantages. In order to overcome these, EP 3 438 024 A1 proposes rod belts, which have auxiliary belt portions, wherein these auxiliary belt portions are arranged in the region of the butt joints between the belt ends.

As illustrated, the production of these belts with the necessary belt lengths represents a further problem. The prior art describes sectional vulcanization in a vulcanizing press. The very high closing pressures, required for such production processes, of the vulcanizing press ensure, in such processes, that, during the creation of the belt profile, unvulcanized and partially vulcanized material is driven out of the vulcanizing chamber formed by the two vulcanizing plates of the press.

A further problem of sectional vulcanization is that the tension members can shift as a result of the sectionally arising shear forces, and thus the fatigue strength of the belts is impaired. It is proposed that, by being connected by fabric, their position is stabilized, but in fact, as a result of the sectional vulcanization, the cord and the tension members present therein shift in the peripheral regions of the individual vulcanized portions. These regions represent potential weak points of these flat belts.

A further disadvantage of the use of fabric in such flat belts is that this fabric represents an inhomogeneity in the belt body consisting of polymeric material. The fabric/polymer connection is generally weaker than the material cohesion in the polymer. This is shown clearly in shear tests, in which the separation of the material composite always occurs between the polymer and the fabric.

The belts of the prior art suffer accordingly from reduced fatigue strength and in particular separation of the materials.

DESCRIPTION OF THE INVENTION

The object of the present invention is to provide flat belts that overcome the above disadvantages, and in particular methods for producing these flat belts with improved fatigue strength and improved durability of the material without separation thereof.

This object is achieved according to the invention by a flat belt as an endless traction means. Furthermore, a method for producing such a flat belt as an endless traction means is provided. Finally, drive means for conveyor belts comprising flat belts according to the invention and agricultural machines having these are provided.

In a first aspect, the present invention relates to a flat belt, namely a flat belt as an endless traction means, suitable for conveyor belts in particular in agricultural machines, wherein the flat belt is configured as an endless belt having a belt length of at least 3 m, for instance at least 3.5 m, in particular at least 4 m, wherein the flat belt has a main body and this main body has an endless tension member element, formed from a multiplicity of tension members transmitting tensile force in the running direction of the flat belt, characterized in that the flat belt has no fabric insert in the force transmission region and optionally furthermore no fabric insert in the back of the belt and/or optionally no fabric insert in the base.

This flat belt as an endless traction means is suitable for conveyor belts of the type mentioned at the beginning. These conveyor belts are used in particular as rod elevators in agricultural machines, for example for conveying and compressing harvested material.

The flat belt according to the invention has, as an endless belt, a belt length of at least 3 meters, for instance at least 3.5 meters. In one embodiment, the flat belt, as an endless belt, is one that has a belt length of at least 4 meters.

The flat belt according to the invention is distinguished by the fact that there is no fabric insert in the force transmission region. In particular, the flat belt is one that has no fabric insert both in the force transmission region and in the back of the belt. Furthermore, one embodiment is that there is no fabric insert in the base. In one embodiment, the belt is one that has no fabric insert in the entire belt body.

In one embodiment, the flat belt is one in which the tension members are formed from polyamide, polyester, carbon and/or aramid. The tension members can be constructed generally from plastic or steel, but also from carbon or basalt. The essential material types are: steel, polyamide, aramid, polyester, carbon, glass and/or basalt, polyether ether ketone, polyethylene, polyethylene terephthalate, polybenzoxazole, or polyethylene 2,6-naphthalate.

In one embodiment, the tension members are coated in order to allow better attachments to the elastomers of the main body. Suitable coatings or sheathings of these tension members are known to a person skilled in the art. Typical coatings or sheathings consist of resorcinol formaldehyde latex (RFL).

In one embodiment, the main body of the belt body is formed from or comprises natural rubber, chloroprene rubber, styrene-butadiene rubber, ethylene propylene diene terpolymer rubber, alkylated chlorosulfonated polyethylene or hydrated acrylonitrile butadiene rubber.

Correspondingly suitable elastomer compounds are known to a person skilled in the art. In particular, natural and synthetic rubber, which can be accordingly vulcanized.

In one embodiment, the flat belts are in the form of V belts. Alternatively, the flat belt is in the form of a toothed belt. The flat belt as an endless traction means can have any form, however.

In a further embodiment, the profiling can be on one side or both sides. This goes for belts that are obtainable with the two methods described herein and for methods involving removal of material and methods involving addition of material.

In one embodiment, the flat belt according to the invention is one in which at least a part of the force transmission region of the flat belt, following vulcanization of the main body, arises by application, by vulcanization or adhesive bonding, of a belt toothing produced in separate methods.

In other words, according to the invention, the flat belt can be configured in two ways. Firstly, the belt can be created with the smallest thickness of the finished flat belt—also referred to as thin flat belt—and subsequently a belt toothing, produced in separate methods, for the force transmission region is applied by vulcanization or adhesive bonding. Alternatively, the flat belt is one that has been produced in a first step as a full belt, i.e. as a belt with a maximum thickness—also referred to as a thick flat belt—and subsequently, following vulcanization of this flat belt with a maximum thickness, the force transmission region is formed by a material-removing method. The final profiling of the flat belt thus takes place following vulcanization of the flat belt either by a method involving addition of material or a method involving removal of material. The flat belt according to the invention is thus produced in at least two work steps in order to obtain the final profiling of this flat belt.

A person skilled in the art is familiar with suitable methods for alternatively producing the flat belt with a finished belt height minus the toothing height or at least minus a part of the toothing height. Likewise, a person skilled in the art is familiar with suitable methods for applying, by vulcanization or adhesive bonding, the belt toothing produced in a separate process.

The profiling, provided in the alternative embodiment, by material removal is likewise a known method. In this case, the flat belt produced in the first process step is produced with a height corresponding to the finished end product. Subsequently, to form the force transmission region, a downstream material removal process is carried out.

As a result of this production process, it is possible to improve the material bond in the belt and to increase the tensile strength and longevity of the material.

In one embodiment, the flat belt according to the invention furthermore has fastening holes for functional elements. In particular when the flat belt is used as an endless traction means in conveyor belts, rods that are transverse to the running direction and mutually parallel can be arranged in order to provide rod belts for rod belt conveyors, in particular in agricultural machines. In other words, there are fastening holes for functional elements in the belt, wherein these fastening holes are introduced after vulcanization, for example in the form of spacer sleeves in order to fix corresponding rod holders, for example by screwing. These spacer sleeves as fastening holes are introduced for example by punching. In this case, these fastening holes are arranged as far as possible such that the tension members present in the flat belt are damaged little if at all and the arrangement of the tension members is not impaired. Corresponding punching as far as possible without damage to the tension members for producing these fastening holes with spacer sleeves is preferred.

In a further aspect, the present invention relates to a method for producing a flat belt as an endless traction means, in particular an endless belt with at least a belt length of at least 3 meters, for instance 3.5 meters, in particular at least 4 meters. The method according to the invention in this case comprises a multistage method having the steps of:
a) forming a flat belt with a main body and an endless tension member element, present therein, by means of a rotary vulcanization process;
b) forming at least a part of the force transmission region on the flat belt obtained by the rotary vulcanization process according to step a).

As already set out above, this forming can be a method involving application of material or a method involving removal of material. In a first aspect, the forming at least of a force transmission region is one involving forming the first traction profile by application, by vulcanization or adhesive bonding, of a vulcanizate produced in a separate process, for example in the form of a belt toothing, in the region of the force transmission region to be created. The vulcanizates produced in the separate process, for example in the form of a belt toothing, are applied by vulcanization or adhesive bonding to the flat belt, the belt height of which corresponds to the smallest height of the finished flat belt minus the toothing height. Corresponding methods are known to a person skilled in the art.

In the alternative embodiment of the forming of at least a part of the force transmission region on the flat belt obtained by the rotary vulcanization process is a process in which material of the vulcanizate is removed to form a first traction profile of a force transmission region. With corresponding formation of belt toothings, these regions are removed for example by milling, cutting or grinding. In other words, in this embodiment of the method according to the invention, the flat belt is produced in the rotary vulcanization process with a final height of the finished end product, the flat belt as an endless traction means. The traction profiles of the force transmission region are formed by material removal.

In the method according to the invention, the first traction profile is one for absorbing the driving force of a drive device, wherein this drive device has a second traction profile that is designed for the non-positive exertion of the driving force on the first traction profile.

The method according to the invention can furthermore include the introduction of the fastening holes, for example in the form of spacer sleeves. These fastening holes are suitable for fastening functional elements to the flat belt. The fastening holes, for example in the form of spacer sleeves, are introduced into the flat belt such that the tension members in the flat belt remain as undamaged as possible. The fastening holes can be produced for example by punching.

In a further aspect, the present application relates to a drive means for conveyor belts, comprising at least one flat belt according to the invention and rods, arranged parallel to one another transversely to the running direction of the at least one flat belt, with punched fastening regions, wherein these fastening regions allow these rods to be fastened to the at least one flat belt, wherein connection takes place by way of rivets or similar fastening means.

In one embodiment, the drive means for conveyor belts are configured in particular as a rod belt for rod belt conveyors of agricultural machines. The drive means according to the invention, containing the flat belt according to the invention, exhibit good tensile strength and longevity under high loading. This applies in particular since the drive means are ones having flat belts which, as endless belts, have a belt length of at least 3 meters, for instance at least 3.5 meters, in particular at least 4 meters.

This improved tensile strength and longevity arises in particular as a result of the rotary vulcanization process according to the invention, such that sectional vulcanization and resultant inhomogeneities in the belt body can be avoided. This applies in particular also because the drive belt according to the invention has no fabric insert in one embodiment.

In one embodiment, the drive means for conveyor belts, in particular configured as a rod belt for rod belt conveyors, have fastening holes for functional elements such that connection by rivets or similar fastening means of the rods arranged transversely to the running direction can accordingly take place via the punched fastening regions thereof with the fastening holes of the flat belt.

Usually, the drive means for conveyor belts have at least 2 flat belts according to the invention, for instance at least 3 flat belts according to the invention, for example 4 flat belts according to the invention. The number of flat belts results from the force application and load on the flat belts as drive means for the conveyor belts. These drive means for conveyor belts are suitable according to the invention as drive means of conveyor belts in the form of rod elevators. Such rod elevators serve, in agricultural machines, for conveying harvested material and, for example in the scope of hay and straw pressing, for compressing the bale shape.

The drive means according to the invention are in particular corresponding rod belts for rod belt conveyors of agricultural machines.

In a further aspect, the present invention relates to agricultural machines having a conveying device designed to convey agricultural harvested material or having a pressing device designed to press agricultural harvested material, wherein the conveying device and/or the pressing device has at least one flat belt according to the invention or a conveyor belt according to the invention. In one embodiment, the agricultural machines furthermore have a drive device with a second traction profile.

This second traction profile, which has a driving force in a non-positive manner on the first traction profile of a flat belt according to the invention of the drive means according to the invention for conveyor belts. The agricultural machines are in particular threshing machines and pressing machines, for instance combine harvesters and round balers.

The invention is explained in more detail in the following text with reference to the appended figures.

FIG. 1A shows a thin flat belt 7 having tension members formed into a cord 8. The profiles can then be applied individually or as a profile chain to these thin flat belts 7 by way of suitable processes involving the addition of material. Corresponding profiles are illustrated in FIG. 2A and FIG. 2B.

Figure 1B:
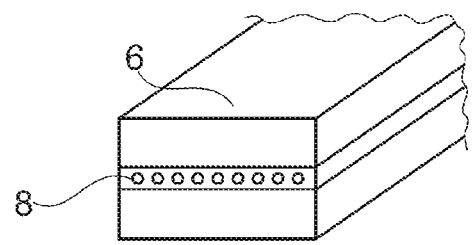
Figure 4:
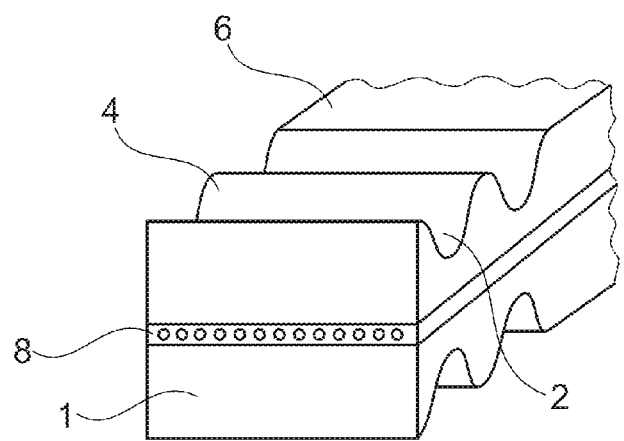
Figure 5:
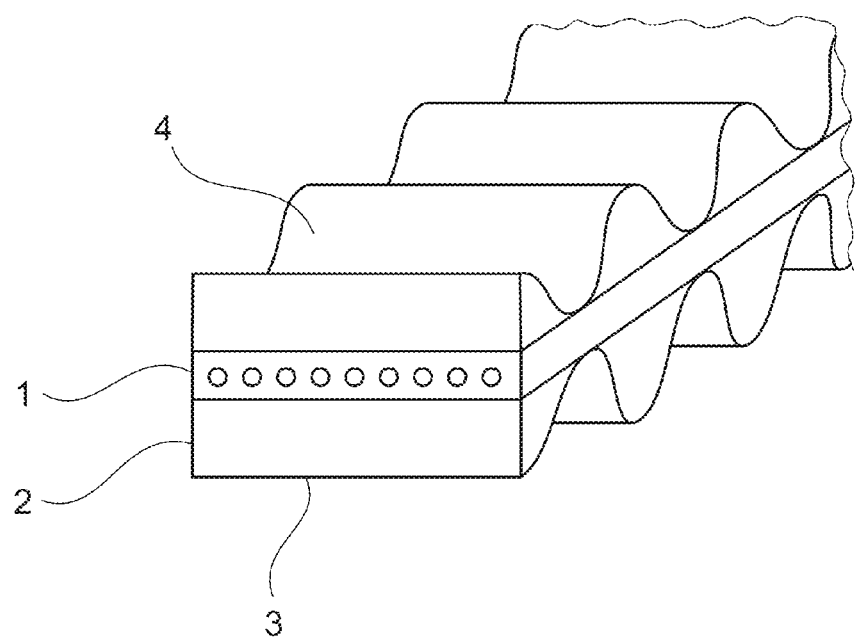

FIG. 1B shows a thick flat belt or full belt 6 having a centrally arranged cord 8. This full belt is suitable for further processing involving removal of material, in particular such that a profile is formed on both sides. Correspondingly formed profiles and intermediate stages thereof are illustrated in FIGS. 4 and 5 below.

Figure 2A:
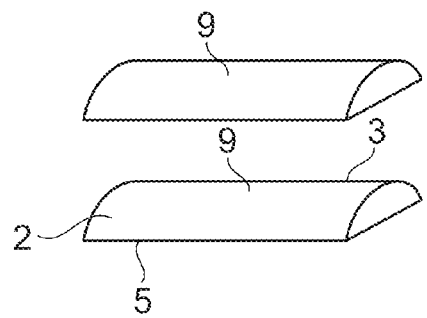

FIG. 2A shows two profile blocks 9 that are free of fabric inserts in the force transmission region 2, in the back 5 and in the base 3. These profile blocks are suitable for attachment to the thin flat belt 7, as illustrated in FIG. 3A.

Figure 2B:
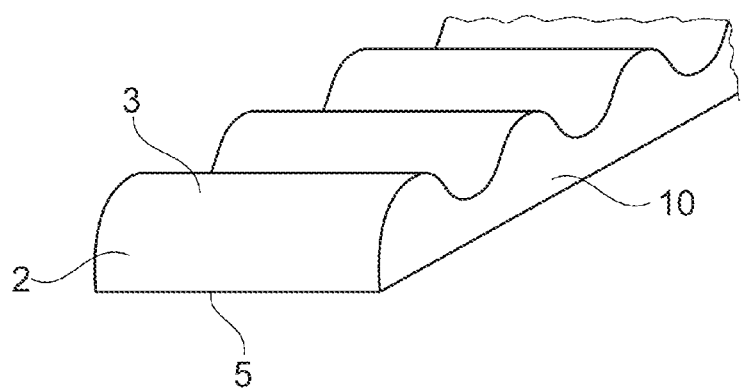

FIG. 2B shows a profile chain 10 with a plurality of teeth. Illustrated is the back, which is present in a manner free of a fabric insert in one embodiment according to the invention. The force transmission region 2, for example indicated by a tooth, is, according to the invention, likewise free of a fabric insert. The base 3 is likewise free of fabric in one environment.

Figure 3A:
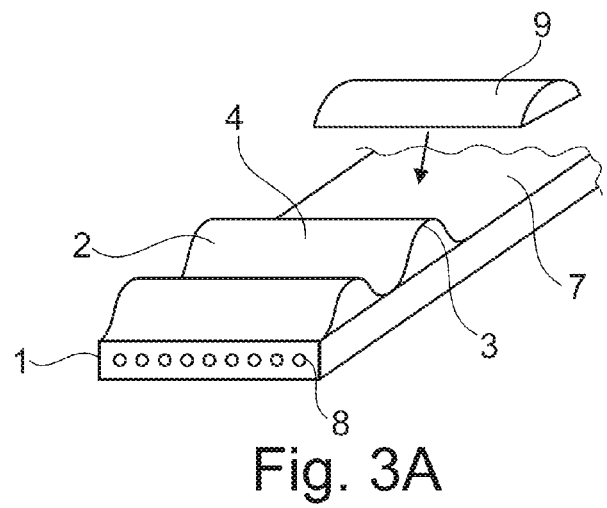

FIG. 3A illustrates a flat belt 7 according to the invention, to which a profile block 9 has been attached as a tooth 4 by application of material. The flat belt 1 according to the invention has a force transmission region 2, which, according to the invention, has no fabric insert, and the base 3, which is likewise free of a fabric insert in one embodiment.

Figure 3B:
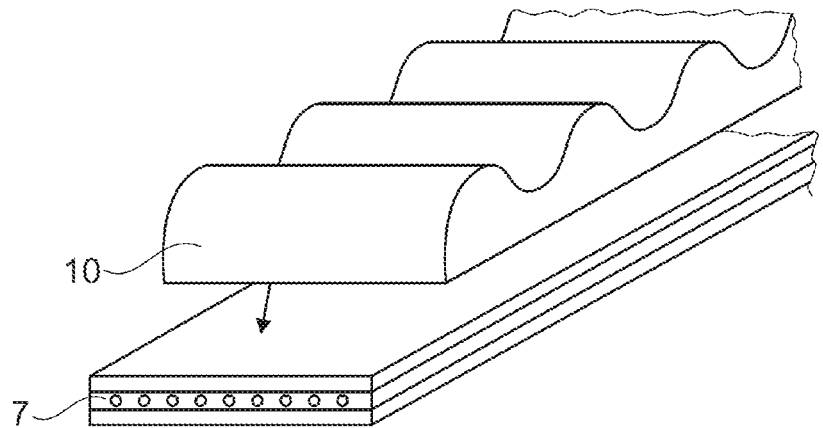

FIG. 3B shows the material application of a profile chain 10 to a thin flat belt 7.

FIG. 4 shows an intermediate step in the production of a flat belt according to the invention on the basis of a full belt as shown in FIG. 1B. In this case, by way of a material removing process, such as grinding, milling or cutting, the tooth 4 is exposed from the full belt 6. In the present case, the flat belt 1 is profiled on both sides, wherein the tension members of the cord 8 are arranged centrally.

Finally, FIG. 5 shows a flat belt according to the invention having the centrally arranged tension members, teeth as profiles, which are arranged on both sides, and the force transmission region 2 in the region of the tooth 4 and of the base 3.

The flat belt according to the invention can form corresponding further embodiment configurations that are not explicitly illustrated in the figures.

LIST OF REFERENCE SIGNS

1—Flat belt
2—Force transmission region
3—Base
4—Tooth
5—Back
6—Flat belt, thick
7—Flat belt, thin 8—Cord
9 Profile block
10 Profile chain

The invention claimed is:

1. Flat endless belt, comprising:
a length of at least 3 m,
a main body comprising an endless tension member element formed from a multiplicity of tension members configured for transmitting tensile force in a running direction of the flat endless belt,
wherein the flat endless belt has no fabric insert in a force transmission region wherein at least a part of the force transmission region, following vulcanization, is formed from the main body by a material-removing method.

2. The flat endless belt according to claim 1, wherein each of the multiplicity of tension members are formed from polyamide, polyester, aramid, carbon, glass, and/or steel.

3. The flat endless belt according to claim 1, wherein the main body consists of or comprises natural rubber, chloroprene rubber, styrene-butadiene rubber, ethylene propylene diene terpolymer rubber, alkylated chlorosulfonated polyethylene, or hydrated acrylonitrile butadiene rubber.

4. Agricultural machine having a conveying device designed to convey agricultural harvested material or having a pressing device designed to press agricultural harvested material, wherein the conveying device and/or the pressing device has at least one flat endless belt according to claim 1.

5. Flat endless belt according to claim 1, wherein the flat endless belt has no fabric insert in a back of the flat endless belt.

6. Flat endless belt according to claim 1, wherein the flat endless belt has no fabric insert in a base.

7. Method for producing a flat endless belt having a belt length of at least 3 meters, comprising
a) forming a flat belt with a main body and an endless tension member element, present therein, by a rotary vulcanization process; and
b) forming at least a part of a force transmission region on the flat belt obtained by the rotary vulcanization process according to step a), wherein the force transmission region is produced by at least partially forming a first traction profile and wherein in step b) material of a vulcanizate is removed.

8. The method according to claim 7, wherein the first traction profile is configured for absorbing a non-positive exertion of a driving force.

9. The method according to claim 7 wherein the flat belt formed in step a) is a final height of the flat belt.

* * * * *